United States Patent [19]

Smith

[11] Patent Number: 5,703,945
[45] Date of Patent: Dec. 30, 1997

[54] HANDS FREE CORDLESS PHONE CADDY

[76] Inventor: Philip J. Smith, 368 Laurel Dr., Satsuma, Ala. 36572

[21] Appl. No.: 571,543

[22] Filed: Dec. 13, 1995

[51] Int. Cl.$^6$ .................................................. H04M 1/00
[52] U.S. Cl. ......................... 379/428; 379/428; 379/446; 379/455
[58] Field of Search ......................... 379/446, 455, 379/441, 447, 426, 454; 455/89, 90; 224/250, 930, 666, 676; D3/218, 215; 150/154, 165

[56] References Cited

U.S. PATENT DOCUMENTS

| | | | |
|---|---|---|---|
| 4,771,927 | 9/1988 | Ventura | 224/252 |
| 5,008,932 | 4/1991 | Sieggen | 379/449 |
| 5,174,483 | 12/1992 | Moore, IV et al. | 224/250 |
| 5,230,016 | 7/1993 | Yasuda | 379/58 |
| 5,295,649 | 3/1994 | Lee | 248/205.2 |
| 5,388,155 | 2/1995 | Smith | 379/446 |
| 5,535,928 | 7/1996 | Herring | 224/250 |

*Primary Examiner*—William Cumming
*Assistant Examiner*—Keith Ferguson
*Attorney, Agent, or Firm*—Joseph N. Breaux

[57] ABSTRACT

A cordless phone caddy is provided having a textile strap releasably securable about a cordless phone, the strap forming an aperture above the keypad of the phone. A clip is attached to the strap opposite the keypad aperture when the strap is secured about the phone for attaching to a user's clothing. Preferably, the strap includes a flap releasably securable over the keypad aperture, protecting the keypad from dirt and the like when not in use.

3 Claims, 2 Drawing Sheets

HANDS FREE CORDLESS PHONE CADDY

TECHNICAL FIELD

The present invention relates to devices for carrying cordless phones and more particularly to devices for carrying cordless phones that are removably supported on a user's clothing.

BACKGROUND ART

In these times, many people have cordless phones in their homes. These phones are especially convenient when a user is cleaning the house or working in the yard, so the user can hear the phone and quickly answer it. However, it is often difficult to carry the phone on the user's person while performing house cleaning activities or working in the yard or garden. Many times the cordless phone is set down only to be misplaced or out of hearing distance. It is also troublesome to take the phone while doing yard work, and getting dirt in the keypad, ear piece and mouth piece.

Many people also carry cellular phones when away from home. These phones, while convenient, are often misplaced. Often these phones are too bulky to carry in a suit or pant pocket, thus, requiring the phone be hand carried increasing the risk of being lost, or left aside defeating the purpose of having a portable phone.

It would be a benefit, therefore to have a device which can be removably secured about a cordless phone for suspending the phone from an article of clothing such as a waist band or belt. It would be a further benefit to have a device that covers the phone protecting it from dirt. It would be a still further benefit, to have a device allowing operational access to the keypad without removing the device from the phone.

GENERAL SUMMARY DISCUSSION OF INVENTION

It is thus an object of the invention to provide a cordless phone caddy that has a textile strap releasably securable about a cordless phone and having a clip for securing to a user's clothing.

It is a further object of the invention to provide a cordless phone caddy that has an aperture over the keypad allowing for operational access to the keypad without removing the strap from the phone.

It is a still further object of the invention to provide a cordless phone caddy that has a flap removably securable over the aperture formed over the keypad.

Accordingly, a cordless phone caddy is provided of type releasably securable about a cordless phone that is adapted for attaching to a user's clothing. The cordless phone caddy includes: a textile strap, a releasable engaging mechanism and a clip.

The textile strap is constructed of a elongated, substantially rectangular piece of fabric such as canvas, cotton or nylon. Preferably, the fabric is pervious to sound and non-insulating allowing the user to use the phone with the ear piece and mouth piece covered by the strap. Preferably, the strap has a width such that when secured about the phone, the phone is covered from the ear piece to the mouth piece.

The strap has a first and second end which are interconnect able about the body of the phone by the releasable engaging mechanism. Preferably, the mechanism includes compatible hook and pile fasteners connected to each end. However, the engaging mechanism may include compatible snap members or hooks and loops connected to each end.

The strap forms an aperture therethrough at least large enough to access a twelve key keypad. The aperture is aligned such that when the strap is secured about the phone the aperture is oriented above the keypad. Preferably, a flap extends from the strap for covering the keypad when not in use. More preferably, the flap has a fastening mechanism connected thereto engagable with the fastening mechanism connected to the first end of the strap.

In a preferred embodiment, the clip is attached laterally to the strap in a manner such that the clip is located opposite the keypad aperture when the strap is secured about the phone, the clip running along the longitudinal axis of the phone. Preferably, the clip runs the entire width of the strap. More preferably the clip has a width substantially the width of the phone to provide support.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
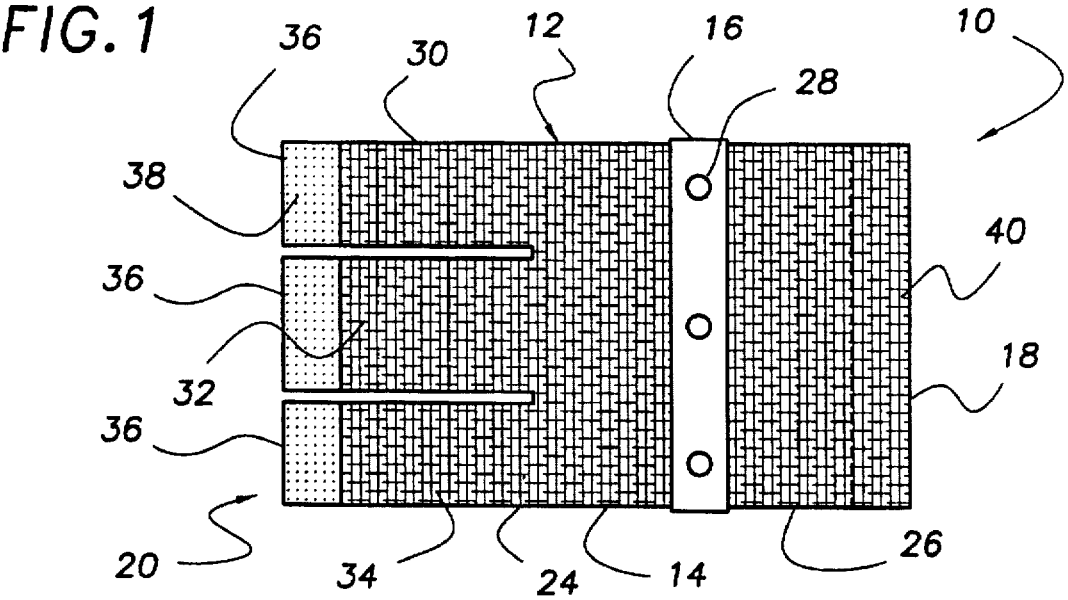
FIG. 1 is a front view of an exemplary embodiment of the cordless phone caddy of the present invention.

FIG. 1 is a front view of an exemplary embodiment of the cordless phone caddy of the present invention generally designated by the numeral 10. Caddy 10 includes a textile strap 12 having a first surface 14 and a clip 16.

Textile strap 12 is a substantially rectangular piece of fabric having a mesh sized to prevent dirt from passing therethrough. Strap 12 has a first end 18 and a second end 20. A carrying portion 26 extending from first end 18 to approximate a midpoint 24 of strap 12. Clip 16 is connected by rivets 28 approximate the midpoint of carrying portion 26.

Strap 12 has a flap portion extending from midpoint 24 to second end 20. The flap portion includes a top flap 30, a middle flap 32 and a bottom flap 34, each flap 30, 32, 34 having a distal end 36 defining second end 20 of strap 12.

A first fastener 38 is connected laterally, by stitching, to first surface 14 adjacent distal end 36 of each flap 30, 32, 34. First fastener 38 is a hook and pile type fastener releasably engageable with a second hook and pile fastener 40. Second fastener 40 is connected to strap 12 laterally, adjacent first end 18.

Figure 2:
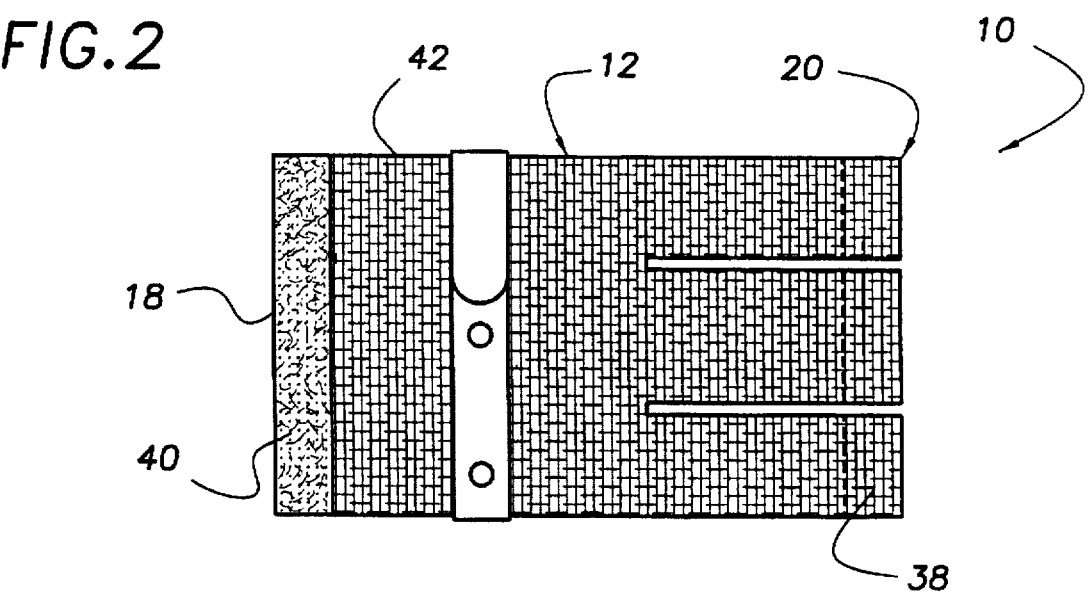
FIG. 2 is a rear view of the cordless phone caddy.

FIG. 2 rear view of cordless phone caddy 10 showing a second surface 42 of textile strap 12. As shown, second fastener 40 is connected to second surface 42. Second fastener 40 is releasably engageable with first fasteners 38 to form a releasable engaging mechanism for interconnecting first end 18 and second end 20.

Figure 3:
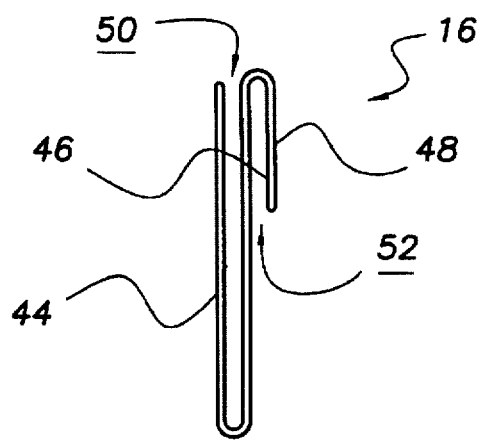
FIG. 3 is a side view of the clip.

FIG. 3 is a side view of clip 16. Clip 16 is formed of a strip of thin metal. Clip 16 is formed into an S-shaped configuration having a first leg 44, a second leg 46 and a third leg 48. First leg 44 and second leg 46 define a first slot 50. Second leg 46 and third leg 48 define a second slot 52. With reference to FIGS. 1 and 3, strap 12 is disposed into slot 50 so that first leg 44 is oriented along first surface 26 and with second leg 46 oriented along second surface 42.

Figure 4:
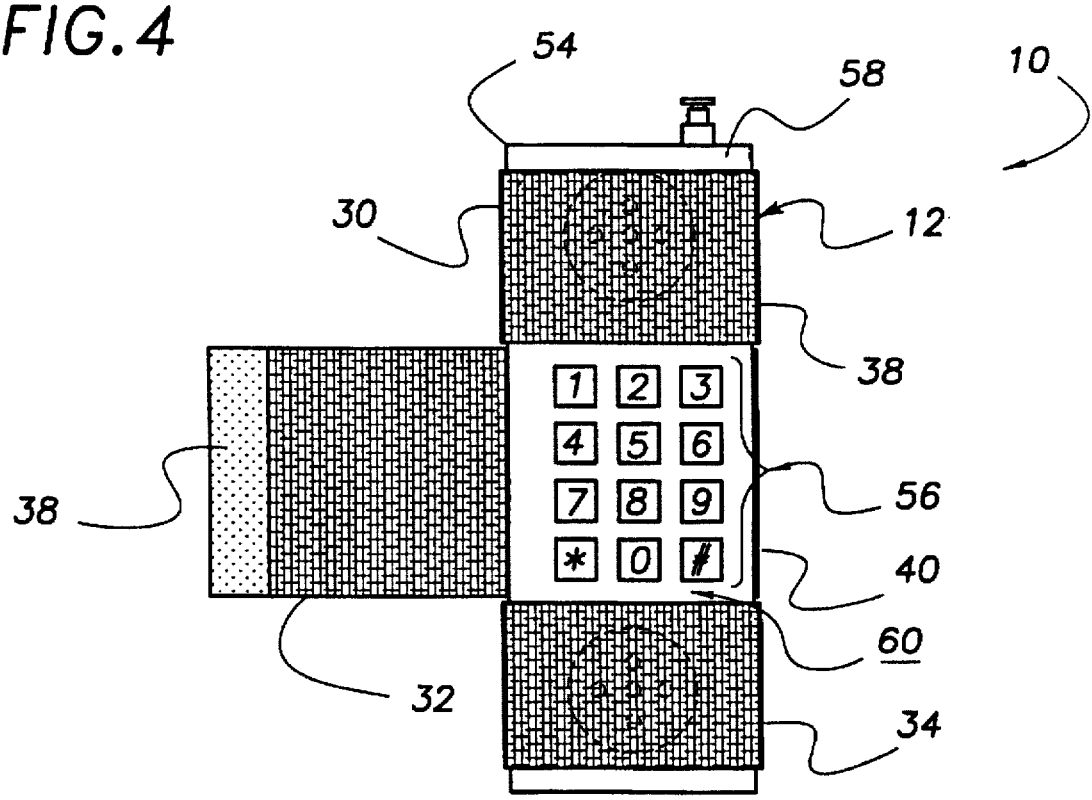
FIG. 4 is a plan view of the cordless phone caddy.

FIG. 4 is a plan view of cordless phone caddy 10. The Figure shows a phone 54 having a twelve button keypad approximate its midpoint secured within textile strap 12.

Phone 54 is releasably secured within strap 12 by wrapping top flap 30 and bottom flap 34 across the face 58 of phone 54 and engaging first fasteners 38 and second fastener 40. Top flap 30 and bottom flap 34 are spaced so as to define a keypad aperture 60. As shown, middle flap 32 is shown disengaged for accessing and operating keypad 56. When phone 54 is not in use, keypad 56 may be covered by connecting first fastener 38 of middle flap 32 to second fastener 40.

Figure 5:
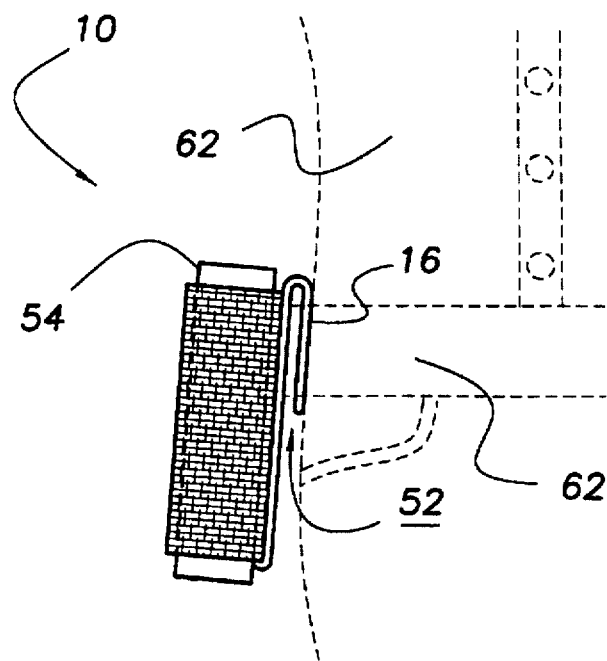
FIG. 5 is a side, plan view of the phone caddy

FIG. 5 is a side, plan view of phone caddy 10. The figure shows phone caddy 10 carrying phone 54 removably supported on an article of a clothing 62 of a user 64. Phone caddy is supported by disposing clothing 62 into second slot 52 of clip 16.

It can be seen from the preceding description that a method and device for carrying cordless phones which has a textile strap releasably securable about a cordless phone and having a clip for securing to a user's clothing, has an aperture over the keypad allowing for operational access to the keypad without removing the strap from the phone and has been provided.

It is noted that the embodiment of the cordless phone caddy described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cordless phone caddy comprising:

a substantially rectangular textile strap having a carrying portion extending from a first end thereof to a midpoint thereof and a flap portion having a top flap, a middle flap and a bottom flap extending from said midpoint, said textile strap being adapted for wrapping about a phone having a keypad located at a midpoint thereof between a mouthpiece and an earpiece, said textile strap being constructed of a mesh fabric that is sufficiently pervious to sound to allow a user to use said phone with said ear piece and said mouth piece covered by one of said top and bottom flaps, respectively, said textile strap having a width such that when said textile strap is secured about said phone, said phone is covered from said ear piece to said mouth piece;

releasable engaging means connected to said textile strap for releasably securing said top flap, said middle flap and said bottom flap to said first end of said textile strap about said phone;

a keypad aperture defined between said top flap and said bottom flap above said keypad of said phone when said top flap and said bottom flap are wrapped across a face of said phone and secured to said first end of said textile strap and said middle flap is disengaged from said first end of said textile strap; and a clip attached to said carrying portion of said textile strap for releasably supporting said textile strap on an article of clothing of a user when said textile strap is secured about said phone.

2. The cordless phone caddy of claim 1, wherein:

said releasable engaging means includes:

a second fastener connected laterally to a second surface of said textile strap adjacent to said first end thereof; and a first fastener connected to a second surface of said textile strap adjacent a distal end of each of said top, middle and bottom flaps, said first fastener being engagable with said second fastener.

3. A cordless phone caddy comprising:

a cordless phone having a having a keypad located on a face thereof between a mouthpiece and an earpiece;

a substantially rectangular textile strap having a carrying portion extending from a first end of said textile strap to a midpoint thereof and a flap portion having a top flap, a middle flap and a bottom flap extending from said midpoint, said textile strap being adapted for wrapping about said phone, said textile strap being constructed of a mesh fabric that is sufficiently pervious to sound to allow a user to use said phone with said ear piece and said mouth piece covered by one of said top and bottom flaps, respectively, said textile strap having a width such that when said textile strap is secured about said phone, said phone is covered from said ear piece to said mouth piece;

a second fastener connected laterally to a second surface of said textile strap adjacent to said first end; and a first fastener connected to a second surface of said textile strap adjacent to a distal end of each of said top, middle and bottom flaps, said first fastener being releasably engageable with said second fastener for releasably securing said top, middle and bottom flaps about said phone;

a keypad aperture defined between said top flap and said bottom flap above said keypad of said phone when said top flap and said bottom flap are wrapped across said face of said phone and secured to said first end of said textile strap and said middle flap is disengaged from said first end of said textile strap; and a clip attached to said carrying portion of said textile strap for releasably supporting said textile strap holding said phone on an article of clothing of a user.

* * * * *